Aug. 25, 1931.  L. B. RIES ET AL  1,820,365
PLUMB LEVEL
Filed Jan. 6, 1930
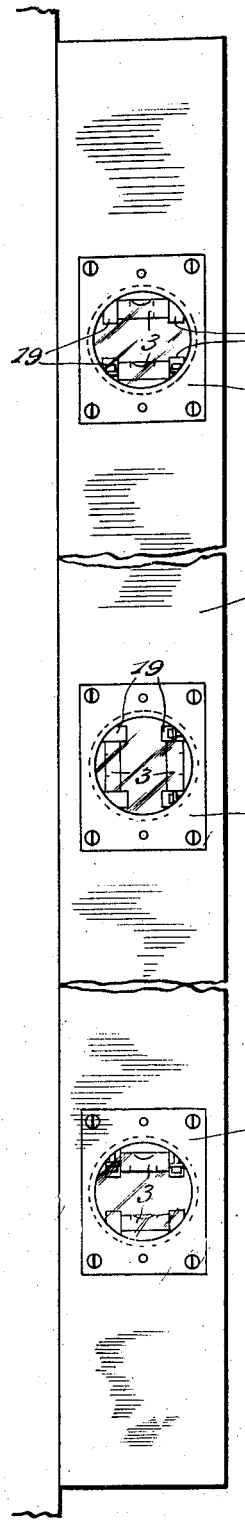
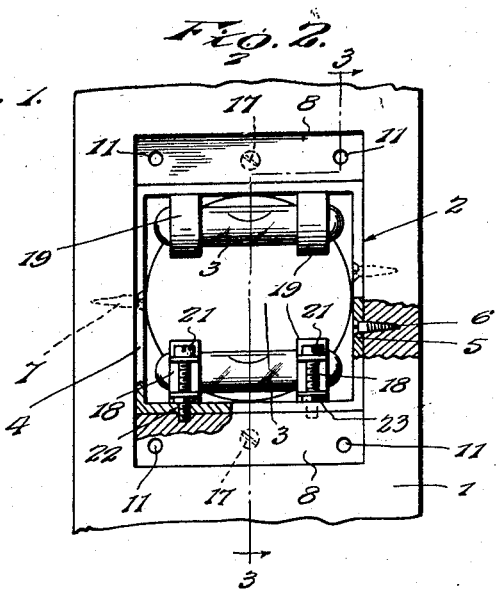
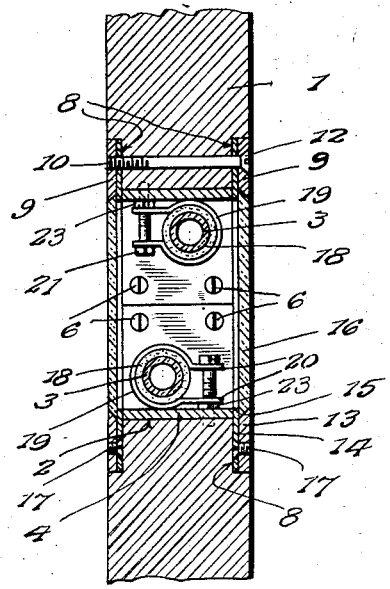
Inventor
L. B. Ries.
J. B. Dickerson.
By Lacey & Lacey
Attorney Patented Aug. 25, 1931

1,820,365

UNITED STATES PATENT OFFICE

LEWIS B. RIES, OF DONORA, AND JAMES B. DICKERSON, OF MONONGAHELA, PENNSYLVANIA

PLUMB LEVEL

Application filed January 6, 1930. Serial No. 418,914.

This invention relates to levels and more particularly to a device of this character which may be used either as a level or as a plumb bar.

One object of the invention is to provide a device of this character capable of being used either horizontally as a level or vertically as a plumb bar, and having bubble glasses so mounted in the bar or body portion of the level that they will be protected from injury in case the device is carelessly handled but at the same time allow the bubble glasses to be easily seen when the device is in use.

Another object of the invention is to provide improved means for mounting the bubble glasses and cause the glasses to be firmly secured in set position while at the same time permitting them to be adjusted when necessary.

Another object of the invention is to not only allow the bubble glass to be easily adjusted and prevented from accidently moving out of a set position, but to also prevent likelihood of a bubble glass becoming broken in case the level should be dropped.

Another object of the invention is to provide improved closures for end portions of openings formed through the bar of the level and in which the bubble glasses are mounted.

The invention is illustrated in the accompanying drawings, wherein,

Figure 1 is a view showing the improved combination level and plumb bar in side elevation, Figure 2 is a fragmentary view illustrating the manner of mounting the bubble glasses, and Figure 3 is a sectional view taken on the line 3—3 of Figure 2.

The bar or body portion 1 of this combination level and plumb bar may be formed of wood or any other material desired. This bar is of a suitable length to permit it to be conveniently used as a level or plumb bar and may be of any desired width and thickness. Openings 2 are formed through the bar 1 in spaced relation to each other longitudinally thereof and in the preferred embodiment one of these openings is located approximately midway the length of the bar and one adjacent each end thereof. These openings constitute pockets or chambers in which bubble glasses 3 are mounted for observation through the ends of the openings and from an inspection of Figure 1 it will be seen that the glasses mounted in the openings at the center of the bar extend longitudinally thereof whereas the bubble glasses mounted in the openings near the ends of the bar extend transversely of the bar. Therefore, the glasses in the opening formed at the center of the bar extend at right angles to those mounted in the openings near its ends and since these glasses may be observed from either side of the bar they may be very easily seen in whatever position the bar is disposed. Therefore, the bar may be used for either horizontal or vertical work.

The bubble glasses mounted in each opening are of the same construction and all mounted in the same manner. Therefore the construction illustrated in Figures 2 and 3 may refer to either the bubble glasses mounted in the opening at the center of the bar or those mounted in the openings formed near its ends. Referring to Figures 2 and 3 it will be seen that the opening 2 is rectangular in shape and its side walls extend substantially parallel to the side edge faces of the bar 1. A frame 4 fits snugly into the opening or pocket 2 and this frame consists of a strip of metal bent to assume a rectangular shape. Openings 5 are formed in the ends of the strip which abut as shown in Figure 3 and through these openings are passed securing screws 6 which together with similar screws 7 pass through the frame at the opposite side thereof from the screws 6, serve to firmly secure the frame within the pocket or chamber. Recesses or seats 8 are formed in the side faces of the bar 1 at opposite sides of the opening so that the closures 9 for the ends of the opening may be countersunk when set in place and it should be noted that the strip of metal from which the frame 4 is formed is of such width that it does not interfere with proper seating of the closures. These closures are secured by bolts 10 passed through openings 11 formed near opposite ends of the seat and each bolt has a head 12 at one end countersunk in the closure through which this end of the bolt passes and the other end of the bolt is threaded and engaged through a threaded opening formed in the second closure. It will thus be seen that the two closures may be securely but releasably held in place and since they are countersunk they will be shielded from injury.

Each of the closures consists of an outer plate 13 and an inner plate 14 which is relatively thin. These plates have openings formed therein disposed in alignment and from an inspection of Figure 3 it will be seen that the walls 15 of the openings formed in the outer plate are undercut. Therefore, when a transparent disc 16 formed of glass or any other suitable material is set in place and the two plates united by screws 17 the transparent plates or windows 16 will be firmly secured and cannot slip out of place. I have therefore provided closures for the ends of the openings or pockets 2 having transparent portions through which the bubble glasses 3 mounted in the pockets may be observed.

These bubble glasses are all mounted in a similar manner and referring to Figures 2 and 3 it will be seen that bands of rubber or other elastic material 18 are fitted snugly upon each glass near its ends. Clamps 19 formed from strips of resilient metal fit about the bands 18 and have their end portions bent to form ears 20 through which are passed adjusting screws 21 and these screws are engaged through threaded openings 22 formed in the adjacent side portions of the frame 4. Lock nuts 23 are provided upon the screws so that after the screws have been tightened they may be secured in set position. The bands 18 serve not only as cushions to prevent the bubble glasses from being broken when the clamps are tightened or in case the level should be accidently dropped, but also permit the glasses to be set in proper angular relation to the body portion of the level. By referring to Figure 3 it will be seen that the clamps of one glass extend in an opposite direction to the clamps of the other glass. Therefore, the two glasses will be each disposed closer to one head than the other and when the device is viewed from either side the glass closest to that side may be easily seen.

When this improved combination level and plumb bar is in use it may be disposed either horizontally or vertically according to the use to which it is to be put. If it is used for horizontal work the bubble glasses mounted in the central openings are observed through the transparent sheets or windows of the closure for the ends of the center opening. When a wall or other upright object is to be tested to see if it is plumb the bar is disposed vertically and the operator may view one of the bubble glasses in either of the openings near its end. Before using the device it is well to test it by placing it against objects which have already been trued. If it is found that any one of the bubble glasses needs adjustment the closures for the ends of the openings in which this glass is located are removed and the screw of the clamp extending about the high end of the bubble glass tightened. This will exert additional compression upon the elastic band and force this end of the bubble glass downwardly until the bubble is accurately centered between the marks upon the glass. Since the screws 21 are close to the open ends of the pockets or openings formed through the bar the heads of the screws may be easily engaged by a screwdriver. It will thus be seen that this improved level and plumb bar will be of a strong and durable construction and may be very easily adjusted when necessary but will not be liable to become inaccurate after having been adjusted. If one of the bubble glasses should become broken a new one can be easily and quickly set in place as it is merely necessary to release the head 9 close to which the screws 21 of the clamp holding the broken glass are disposed and these screws can be unscrewed, thereby releasing the clamps which may then be engaged about a new glass and again screwed to the frame 4. After the new glass has been mounted it will be necessary to adjust the screws until the glass is properly set.

Having thus described the invention, we claim:

1. A level comprising a bar having an opening formed therethrough, a frame in said opening secured to the bar about the margins of the opening, a bubble glass, elastic bands fitting about said glass adjacent opposite ends thereof, clamps engaged about said bands and each having spaced ears extending therefrom, at a side of the glass, and screws passed through said ears and engaged in threaded openings formed in said frame to secure the clamps to the frame.

2. A level comprising a bar having an opening formed therethrough, a frame in said opening, a bubble glass in said opening extending longitudinally of a side portion of said frame, clamps fitting about said glass and bearing against the adjacent side portion of said frame, adjusting screws for said clamps having threaded ends engaged in threaded openings formed in said frame, a securing nut upon each screw between the frame and the adjacent ear of the clamp, and elastic packing about said glass encircled by said clamps and adapted to be compressed thereby whereby the bubble glass may be angularly adjusted relative to the frame and bar and held in a set position by adjusting said screws.

3. A level comprising a bar having an opening formed therethrough, the said opening being rectangular in shape and having side walls extending substantially parallel to side edge faces of said bar, a rectangular frame fitting snugly into said opening and secured against walls of the opening, a bubble glass in said opening extending longitudinally of one wall thereof, the adjacent portion of said frame having threaded openings formed therein in spaced relation to each other longitudinally thereof, bands of compressible material fitted around said glass near its ends, clamps extending about said bands and having spaced end portions projecting transversely from the glass to form ears, said clamps bearing against said frame and the ears of each clamp having openings formed therein, screws passed through the openings in the ears of said clamps and screwed into the threaded openings of said frame, and lock nuts upon said screws between the frame and adjacent ears of the clamps.

4. A level comprising a bar having an opening formed therethrough, a frame in said opening secured to the bar against walls of the opening, a bubble glass, elastic bands fitting about said glass adjacent opposite ends thereof, clamps each consisting of a strip having its intermediate portion engaged about a band and its end portions bent to form spaced ears extending transversely of the glass from one side thereof, and screws passed through the ears of said clamps and engaged in threaded openings formed in said frame to secure the clamps to the frame, side faces of the bar being recessed to form seats leading from the ends of the opening in the bar, closures for the ends of said opening having portions fitting into said seats with their outer faces flush with the side faces of the bar, each closure consisting of inner and outer plates formed with aligned sight openings and a transparent sheet engaged between the inner and outer plates with its margins gripped between the plates, removable fasteners for uniting said plates, and fasteners passed through said bar and engaged through the portions of the closures extending into said seats to secure the closures in place.

In testimony whereof we affix our signatures.

LEWIS B. RIES. [L. S.]
JAMES B. DICKERSON. [L. S.]